United States Patent
Nomura et al.

(10) Patent No.: US 8,268,427 B2
(45) Date of Patent: Sep. 18, 2012

(54) DISPLAY SHEET

(75) Inventors: Tsumoru Nomura, Tokyo (JP); Senichirou Araki, Tochigi (JP); Yasuyo Omori, Tochigi (JP); Naomi Kuwakubo, Tochigi (JP); Atsushi Nagakura, Tokyo (JP); Soichi Funayama, Tokyo (JP)

(73) Assignee: Koyo Sangyo Co., Ltd., Tokyo (JP)

( * ) Notice: Subject to any disclaimer, the term of this patent is extended or adjusted under 35 U.S.C. 154(b) by 308 days.

(21) Appl. No.: 12/808,429

(22) PCT Filed: Dec. 17, 2008

(86) PCT No.: PCT/JP2008/072935
§ 371 (c)(1),
(2), (4) Date: Jun. 16, 2010

(87) PCT Pub. No.: WO2009/084438
PCT Pub. Date: Jul. 9, 2009

(65) Prior Publication Data
US 2011/0111174 A1 May 12, 2011

(30) Foreign Application Priority Data

Dec. 27, 2007 (JP) .................................. 2007-336483

(51) Int. Cl.
*B32B 9/00* (2006.01)
*B32B 3/00* (2006.01)
*B32B 7/12* (2006.01)
*D06N 7/04* (2006.01)

(52) U.S. Cl. ..................... 428/40.1; 428/41.6; 428/42.1; 428/141; 428/156; 428/161; 428/172; 428/173; 428/343; 428/354

(58) Field of Classification Search ................ 428/40.1, 428/41.6, 42.1, 98, 141, 156, 161, 172, 173, 428/212, 213, 332, 343, 354, 913.3
See application file for complete search history.

(56) References Cited

FOREIGN PATENT DOCUMENTS

| JP | 56-151551 | 11/1981 |
|---|---|---|
| JP | 60-67139 | 4/1985 |
| JP | 2-144461 | 6/1990 |
| JP | 8-118553 | 5/1996 |
| JP | 11-10823 | 1/1999 |
| JP | 2003-39582 | 2/2003 |
| JP | 2004-176457 | 6/2004 |
| JP | 2005-505379 | 2/2005 |
| WO | 03/032855 | 4/2003 |

*Primary Examiner* — Patricia Nordmeyer
(74) *Attorney, Agent, or Firm* — Greenblum & Bernstein P.L.C.

(57) ABSTRACT

A display sheet includes a substrate; front-side and rear-side synthetic resin composition layers formed on front and rear surfaces, respectively, of the substrate; and an ink layer formed by ink-jet on the front-side synthetic resin composition layer. The substrate is made of sailcloth having projections and depressions on front and rear surfaces thereof. A surface of the front-side synthetic resin composition layer is formed on an irregular surface having projections and depressions attributed to the projections and depressions of the surface of the substrate. The ink layer is formed by causing a fine ink to cover the projections and permeate the depressions.

18 Claims, 4 Drawing Sheets

| | BEFORE PROCESSING | AFTER PROCESSING |
|---|---|---|
| EX. 1 |  |  |
| EX. 2 |  |  |
| EX. 3 |  |  |
| EX. 4 |  |  |

FIG. 4

| | BEFORE PROCESSING | AFTER PROCESSING |
|---|---|---|
| COMP. EX. 1 | | |
| COMP. EX. 2 | | |

DISPLAY SHEET

TECHNICAL FIELD

The present invention relates to a display sheet that is attached to and peelable from a floor surface paved with asphalt, concrete, or mortar, as a simple advertisement or guide sign in indoor or outdoor places exposed to the traffic of pedestrians.

BACKGROUND ART

Conventionally, highly indicative or decorative sheets intended for displaying indoor or outdoor information, advertisements, or guidance are often used on wall or floor surfaces. Taking outdoor places as examples, such display sheets are attached to floor surfaces of roads, viaducts, platforms, building rooftops, parking lots, and the like. The utilization of these display sheets in various spaces as information media such as advertisements, guide signs, and information is frequently observed in our daily lives. When these display sheets are attached to outdoor floor surfaces as described above, they are required to retain their indicativeness or decorativeness even after exposure to a heavy traffic of pedestrians on the floor surfaces. For this reason, the display sheets are typically coated with a transparent protective film having mechanical durability or strength, such as wear resistance or damage resistance, on their printed surfaces printed with information such as advertisements, or guide or information signs, in order to retain desired strengths and appearances. For this purpose, protective films having not only durability but also contamination resistance have been previously proposed (see, for example, Patent Document 1). Methods for coating a printed surface printed with information, such as information or guide signs, with a protective layer have also been proposed (see, for example, Patent Document 2). These protective films or layers are taught to enhance the mechanical durability, wear resistance, and damage resistance.

Further, display sheets attached to floor surfaces are required to have surface-slip resistance as a capability different from capabilities required in display sheets intended for signboards or wall surfaces and not for floor surfaces. That is, display sheets attached to floor surfaces must allow pedestrians to safely travel thereon. Known methods for enhancing the slip resistance are display sheets of a type wherein inorganic particles that form projections on a sheet surface are dispersed and fixed (see, for example, Patent Document 3); and display sheets of a type having a specific surface shape by the application of roughness treatment to the sheet surface (see, for example, Patent Document 4). Display sheets of the former type have been obtained by extending the idea of providing a protective layer on a printed surface. Moreover, the hard particles added, rather than a synthetic resin that is a principal component used in the protective layer, provide a non-slip function. Display sheets of the latter type also require the provision of a protective layer as a precondition, wherein slip resistance is achieved by processing the surface of a principal material that forms the surface of the protective layer, i.e., a synthetic resin or the like, into a specific shape, thereby ensuring transparency as well.

Patent Document 1: Japanese Unexamined Patent Publication No. 1996-118553 (the claims; FIG. 1)
Patent Document 2: Japanese Unexamined Patent Publication No. 1999-10823 (the claims; FIG. 1)
Patent Document 3: Japanese Unexamined Patent Publication No. 1990-144461 (the claims)
Patent Document 4: Japanese Unexamined Patent Publication No. 2003-39582 (the claims; FIGS. 1 and 2)

DISCLOSURE OF THE INVENTION

Problem to be Solved by the Invention

However, protecting a printed surface with a protective film or layer in order to protect the printed surface requires the operation of coating the printed surface with the protective film, or requires the operation of forming a protective layer in addition to the printing operation. This increases the number of operation steps, thereby increasing the unit cost of the resulting article. This problem may be avoided by omitting the formation of a protective layer on the printed surface. However, the omission of the protective layer degrades the wear resistance, damage resistance, and the like of the printed surface, and also degrades the surface-slip resistance.

An object of the present invention is to provide a display sheet that does not include a protective layer, but is resistant to deterioration of the visibility of a display or decoration due to the wear of a printed surface, even when it is used on an outdoor floor surface on which people frequently walk. This obviates an increase in cost due to the provision of a protective layer, which has been required in conventional display sheets to protect printed surfaces.

Another object of the invention is to provide a display sheet that can be easily peeled from a floor surface or wall surface when it is peeled after use, without causing breakage of the substrate sheet itself due to the peeling stress, and leaving an unpeeled portion.

Means for Solving the Problem

The inventors found an effective solution to the problem by printing on a surface having a surface shape that satisfies specific conditions.

Figure 1:
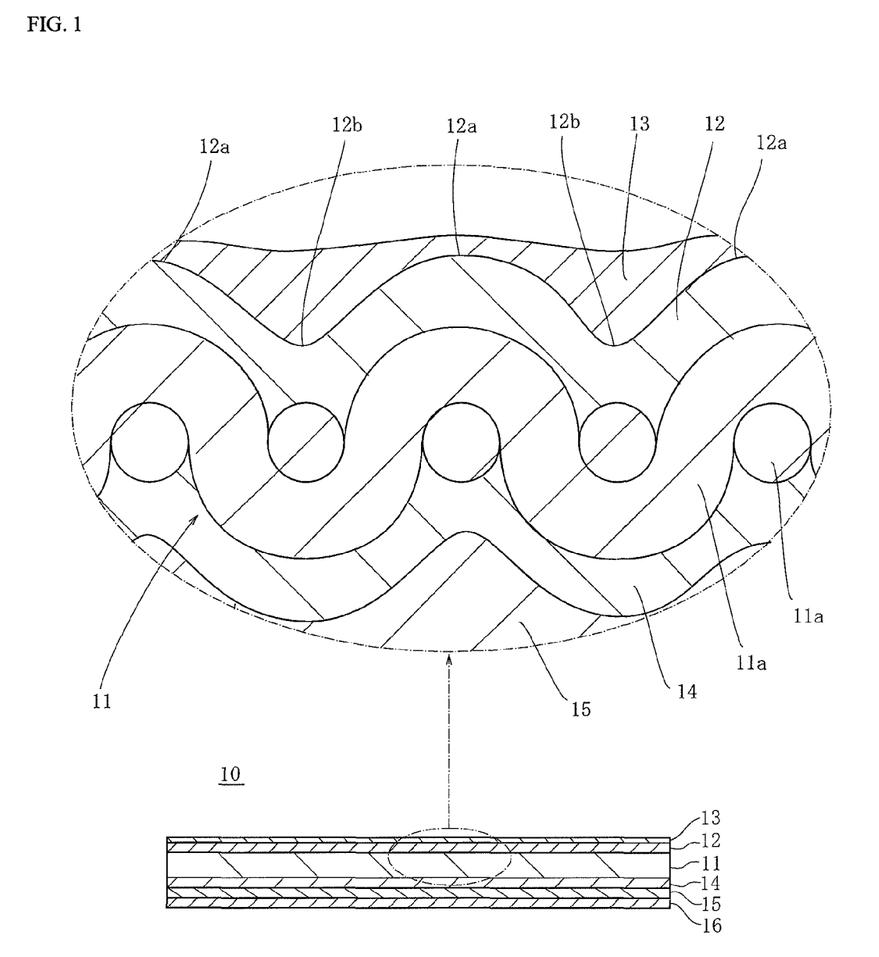
FIG. 1 shows cross sections of the structure of a display sheet according to an embodiment of the present invention.
Figure 2:
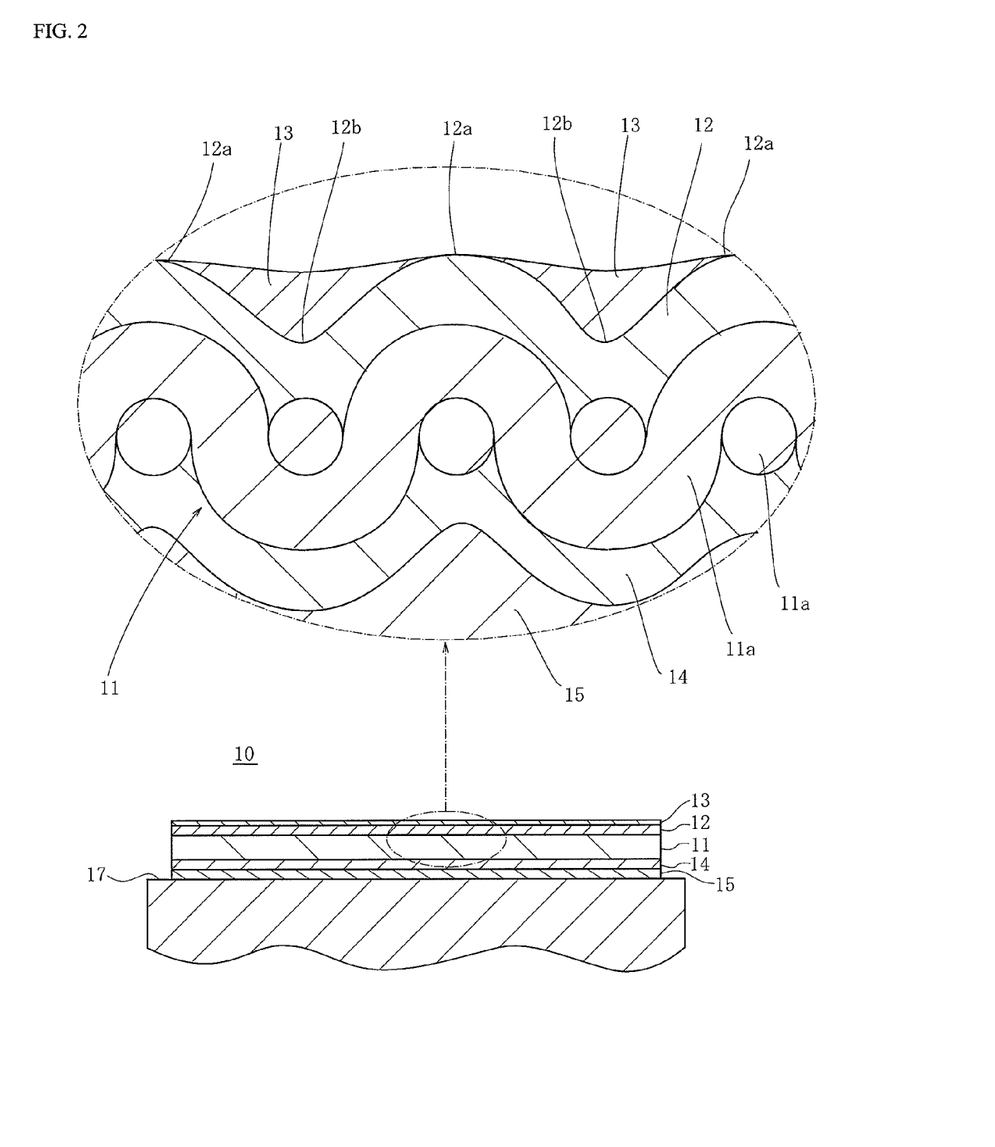
FIG. 2 shows cross sections showing the display sheet of FIG. 1 in which the projections of the synthetic resin layer have appeared on the surface due to the wear of the ink layer.

Specifically, according to a first aspect of the invention, there is provided an improved display sheet comprising, as shown in FIG. 1 or 2, a substrate 11 whose rear surface is bonded to a floor surface or wall surface 17; a front-side synthetic resin composition layer 12 formed on a front surface of the substrate 11; a rear-side synthetic resin composition layer 14 formed on a rear surface of the substrate 11; and an ink layer 13 formed on the front-side synthetic resin composition layer 12.

The display sheet has characteristic features in that the substrate 11 is made of sailcloth having projections and depressions on front and rear surfaces thereof, and having an average thickness of 200 to 500 µm and a mass of 100 to 300 g/m$^2$; a surface of the front-side synthetic resin composition layer 12 is formed on an irregular surface having projections 12a and depressions 12b attributed to the projections and depressions of the surface of the substrate 11; the surface of the front-side synthetic resin composition layer 12 has an arithmetic mean deviation Ra of roughness profile of 10 to 50 µm, and a mean width RSm of roughness profile elements of 500 to 2,000 µm, at cut-off values λs and λc of 0.25 mm and 8 mm, respectively, as measured according to JIS-B-0601 standard (2001); a surface of the rear-side synthetic resin composition layer 14 is formed on an irregular surface having projections 14a and depressions 14b attributed to the projections and depressions of the surface of the substrate 11; an adhesive layer 15 to be bonded to the floor surface or wall surface 17 is formed on the rear-side synthetic resin composition layer 14; and the ink layer 13 is formed by causing a fine ink to cover the projections 12a and permeate the depressions 12b.

In the display sheet according to the first aspect, a protective layer that has conventionally been formed on a printed surface is omitted. This reduces the number of operation steps to effectively reduce costs and simplify the manufacturing process. Furthermore, because the ink layer 13 is formed by causing a fine ink to permeate the depressions 12b of the front-side synthetic resin composition layer 12, the wear of the ink layer 13 due to the traffic of pedestrians causes the projections 12a of the front-side synthetic resin composition layer 12 to appear on the surface, as shown in FIG. 2. Because of the use of a material having a relatively high mechanical strength, the projections 12a of the front-side synthetic resin composition layer 12 are resistant to wear as compared to the ink layer 13. For this reason, the ink layer 13 remaining in the depressions 12b of the front-side synthetic resin composition layer 12 is protected by the projections 12a adjacent to the depressions 12b. This prevents the visibility of a display or decoration from deteriorating due to the wear of the printed surface, even when the display sheet is used on an outdoor floor surface on which people frequently walk.

Moreover, the surface of the front-side synthetic resin composition layer 12 on which the ink layer 13 is formed has an arithmetic mean deviation Ra of roughness profile within the above-defined range, and a mean width RSm of roughness profile elements within the above-defined range, at cut-off values $\lambda s$ and $\lambda c$ of 0.25 mm and 8 mm, respectively, as measured according to JIS-B-0601 standard (2001). Specifically, the surface of the front-side synthetic resin composition layer 12 has a specific surface shape having the projections 12a and depressions 12b. This specific surface shape minimizes the wear area, which is the area of contact with the soles of pedestrians, and also causes the fine ink to permeate the depressions 12b, thereby suppressing deterioration of the visibility of a display or decoration.

According to a second aspect of the invention, there is provided a display sheet according to claim 1, wherein the sailcloth is a woven fabric made of warp yarns of a synthetic fiber having a decitex of 22 to 67 and a yarn density of 40 to 80 yarns per inch (15.7 to 31.5 yarns per cm); and weft yarns of a synthetic fiber having a decitex of 22 to 67 and a yarn density of 30 to 70 yarns per inch (11.8 to 27.6 yarns per cm).

According to a third aspect of the invention, there is provided a display sheet according to claim 1 or 2, wherein the ink layer 13 covering the projections 12a and formed in the depressions 12b is present as an outermost layer.

According to a fourth aspect of the invention, there is provided a display sheet according to claim 1 or 2, further including an anti-stain coating layer on a surface of the ink layer 13 covering the projections 12a and formed in the depressions 12b.

According to a fifth aspect of the invention, there is provided a display sheet according to claim 4, wherein the anti-stain coating layer is present as an outermost layer.

According to a sixth aspect of the invention, there is provided a display sheet according to claim 1, wherein the ink layer 13 is formed by causing a fine ink to cover the projections 12a and permeate the depressions 12b, using an ink-jet method or a silk-screen printing method.

According to a seventh aspect of the invention, there is provided a display sheet according to any one of claims 1 to 6, further including an adhesive layer 15 formed on the rear-side synthetic resin composition layer 14, and a release paper 16 laminated to a surface of the adhesive layer 15, wherein the release paper 16 is made of crepe paper that has been creped and having a tensile elongation at break of 5 to 50% as measured according to JIS-P-8113.

In the display sheet according to the seventh aspect, the display sheet can be attached by using the adhesive layer 15 that appears on the surface by removing the release paper 16. The adhesive layer 15 facilitates the attachment of the display sheet to the floor surface or wall surface 17.

Moreover, the display sheet 10 of the invention has a relatively large thickness because the substrate 11 is made of sailcloth, and the adhesive layer 15 is additionally formed. When the display sheet is wound for storage or the like with the release paper 16 facing outside, the release paper 16 is maintained under a great tension in the direction of elongation. However, in the display sheet 10 of the invention, the use of the crepe paper having a tensile elongation at break of 5 to 50% as release paper 16 allows the release paper 16 placed under a tension in the direction of elongation to elongate together with the adhesive layer 15. This prevents the release paper 16 and adhesive layer 15 from shifting relative to each other. Further, when the wound display sheet is unwound, the release paper 16 wound in the elongated state shrinks together with the adhesive layer 15 in the direction of elongation, thereby preventing partial peeling of the release paper 16 from the adhesive layer 15. This prevents the formation of any streak-like hollow (hereinafter referred to as a "tunnel") that extends in the width direction of the release paper 16 due to the peeling.

Effect of the Invention

In the display sheet of the invention, the substrate is made of sailcloth having projections and depressions on front and rear surfaces thereof; the surface of the front-side synthetic resin composition layer has a specific surface shape having projections and depressions attributed to the projections and depressions of the substrate; and the ink layer is formed by causing a fine ink to permeate the depressions. Therefore, when the display sheet is attached to a floor surface, the wear of the ink layer due to the traffic of pedestrians causes the projections of the front-side synthetic resin composition layer to appear on the surface. Moreover, because of the use of a material having a relatively high mechanical strength, the projections of the front-side synthetic resin composition layer are resistant to wear as compared to the ink layer. For this reason, even though a protective layer that has conventionally been formed on a printed surface is omitted, the ink layer remaining in the depressions of the front-side synthetic resin composition layer is protected by the projections adjacent to the depressions. This prevents the visibility of a display or decoration from deteriorating due to the wear of the printed surface, even when the display sheet is used on an outdoor floor surface on which people frequently walk.

Further, because of the use of sailcloth as the substrate, the display sheet of the invention has a very high tensile strength at break, and has projections and depressions on its rear surface that is to be bonded to a floor surface or wall surface. This enables a used display sheet to be easily and neatly peeled from the floor or wall surface without breaking the display sheet, thus leading to excellent workability.

Moreover, the display sheet may further include an adhesive layer formed on the rear-side synthetic resin composition layer, and release paper laminated to a surface of the adhesive layer, wherein the release paper has been creped and has a tensile elongation at break of 5 to 50%. In this case, when the display sheet is wound for storage or the like with the release paper facing outside, the release paper is maintained under a great tension in the direction of elongation; however, when the wound sheet is unwound, the release paper placed under a tension in the direction of elongation elongates together with the adhesive layer, thereby preventing the release paper and adhesive layer from shifting relative to each other. This prevents partial peeling of the release paper from the adhesive layer when unwinding the display sheet, thereby preventing the formation of a tunnel in the release paper due to the peeling.

BEST MODES FOR CARRYING OUT THE INVENTION

Best modes for carrying out the invention are next described with reference to the drawings. As shown in FIG. 1 or 2, a display sheet 10 of the invention includes a substrate 11 whose rear surface is bonded to a floor surface or wall surface 17; a front-side synthetic resin composition layer 12 formed on a front surface of the substrate 11; a rear-side synthetic resin composition layer 14 formed on a rear surface of the substrate 11; and an ink layer 13 formed on the front-side synthetic resin composition layer 12. A characteristic feature of the display sheet 10 of the invention is that the substrate 11 is made of sailcloth having projections and depressions on surfaces thereof. Specifically, the substrate 11 used in the invention is made of sailcloth having strength and flexibility sufficient for applications to floor surfaces. Yarns used for the sailcloth are yarns 11a made of synthetic resins such as polyester resins, polyolefin resins, polyurethane resins, polyvinyl chloride resins, ethylene-vinyl acetate copolymer resins, and polyamide resins, as well as blends and copolymers thereof; and relatively thick yarns 11a made of cotton, flax, hemp, and jute. The sailcloth is made of a relatively thick, plain-weave fabric produced by densely weaving any of these yarns 11a. Because the sailcloth is obtained by weaving the relatively thick yarn 11a, it has relatively large projections and depressions on front and rear surfaces thereof. The use of the sailcloth as the substrate 11 enables well-defined projections and depressions to be formed on the substrate 11. Preferably, sailcloth made of a plain-weave fabric using a multifilament yarn or spun yarn of a polyester resin fiber is used as the substrate 11 in view of its mechanical strength. As used herein, the term "sailcloth" is defined as a canvas-weave fabric that is tough and strong.

The sailcloth used in the invention has an average thickness of 200 to 500 μm and a mass of 100 to 300 g/m². If the average thickness is less than 200 μm, the formation of a desired irregular surface on the surface of the front-side synthetic resin composition layer will be difficult. Conversely, if the average thickness exceeds 500 μm, the total thickness of the resulting article will become too large, which is problematic for a display sheet attached to a smooth floor surface. Further, if the mass per unit area is less than 100 g/m², a sufficient mechanical strength cannot be obtained. Conversely, if the mass per unit area exceeds 300 g/m², the flexibility of the sailcloth will be poor, making handling of the resulting article difficult. The sailcloth preferably has an average thickness of 250 to 450 μm and a mass of 120 to 280 g/m².

The sailcloth used is a woven fabric made of warp yarns having a decitex of 22 to 67 and a yarn density of 40 to 80 yarns per inch (15.7 to 31.5 yarns per cm), and weft yarns having a decitex of 22 to 67 and a yarn density of 30 to 70 yarns per inch (11.8 to 27.6 yarns per cm). If the warp yarns have a decitex less than 22, the mechanical strength in the running direction of the sailcloth, i.e., the feed direction (the machine direction), during the manufacturing of the sailcloth will often become low, or the formation of a desired irregular surface on the surface of the front-side synthetic resin composition layer will often be difficult. Conversely, if the warp yarns have a decitex exceeding 67, the flexibility of the sailcloth will often become poor, or the formation of a desired irregular surface on the surface of the front-side synthetic resin composition layer will often be difficult. If the weft yarns have a decitex less than 22, the mechanical strength in the width direction of the sailcloth, i.e., the direction perpendicular to the feed direction (the cross direction), during the manufacturing of the sailcloth will often become low. Conversely, if the weft yarns have a decitex exceeding 67, the flexibility of the sailcloth will often become poor, and the formation of a desired irregular surface on the surface of the front-side synthetic resin composition layer will often be difficult. If the warp yarns have a yarn density of less than 40 yarns per inch, the mechanical strength in the running direction of the sailcloth, i.e., the feed direction (the machine direction), during the manufacturing of the sailcloth will often become low, or the formation of a desired irregular surface on the surface of the front-side synthetic resin composition layer will often be difficult. Conversely, if the warp yarns have a yarn density exceeding 80 yarns per inch, the flexibility of the sailcloth will often become poor, and the formation of a desired irregular surface on the surface of the front-side synthetic resin composition layer will often be difficult. If the weft yarns have a yarn density of less than 30 yarns per inch, the mechanical strength in the width direction of the sailcloth, i.e., the direction perpendicular to the feed direction (the cross direction), during the manufacturing of the sailcloth will often become low. Conversely, if the weft yarns have a yarn density exceeding 70 yarns per inch, the flexibility of the sailcloth will often become poor, and the formation of a desired irregular surface on the surface of the front-side synthetic resin composition layer will often be difficult. The warp yarns preferably have a decitex of 28 to 61 and a density of 43 to 70 per inch (16.9 to 27.6 yarns/cm), and the weft yarns preferably have a decitex of 28 to 61 and a density of 35 to 65 per inch (13.8 to 25.6 yarns/cm).

Material of each of the front-side synthetic resin composition layer 12 formed on the front surface of the substrate 11 and the rear-side synthetic resin composition layer 14 formed on the rear surface of the substrate 11 is not particularly limited as long as the material has sufficient water resistance and printability for applications to floor surfaces. Examples of such materials include synthetic resins such as vinyl chloride resins, ethylene-vinyl acetate copolymer resins, polyester resins, polyolefin resins, polyurethane resins, and polyamide resins, as well as blends and copolymers thereof. A soft vinyl chloride resin is particularly preferable in view of its cost and good processability when coating the substrate 11. The front-side synthetic resin composition layer 12 is obtained by applying such a synthetic resin to the substrate 11 using a roll coater, a spray, or the like. On the surface of the thus-obtained front-side synthetic resin composition layer 12, projections 12a and depressions 12b attributed to the projections and depressions of the surface of the substrate 11 are continuously formed. Thus, the surface of the front-side synthetic resin composition layer 12 is formed on this irregular surface having the projections 12a and depressions 12b. The projections 12a and depressions 12b serve to minimize the wear area, which is the area of contact with the soles of pedestrians, thereby suppressing deterioration of the visibility of a display or decoration present on the ink layer 13 described below. The projections 12a and depressions 12b in the invention may also be irregularly arranged instead of being regularly arranged.

The surface of the front-side synthetic resin composition layer 12 formed on the irregular surface having the projections 12a and depressions 12b is defined by two parameters, i.e., the arithmetic mean deviation Ra of roughness profile and the mean width RSm of roughness profile elements, as defined according to JIS-B-0601 (2001). Here, Ra represents the degree of protrusion of the projections 12a and the degree of recession of the depressions 12b; and RSm represents the distribution frequency of the projections 12a and depressions 12b.

The surface shape of the front-side synthetic resin composition layer 12 in the invention is limited by the arithmetic mean deviation Ra of roughness profile, as defined according to JIS-B-0601 (2001) as a parameter in the height direction. Specifically, a feature of the surface of the front-side synthetic resin composition layer 12 is that the arithmetic mean deviation Ra of roughness profile is 10 to 50 μm at cut-off values λs and λc of 0.25 mm and 8 mm, respectively, as measured according to JIS-B-0601 (2001). The arithmetic mean deviation Ra of roughness profile is preferably 14 to 40 μm, and more preferably 14 to 20 μm. If Ra is less than 10 μm, the surface will be too smooth, thus increasing the wear area, and making it impossible to maintain the visibility of the display or decoration. Conversely, if Ra exceeds 50 μm, the surface will be too rough for a printed surface, making the graphics of the display or decoration significantly poor, and giving pedestrians an unpleasant feeling.

The surface shape of the front-side synthetic resin composition layer 12 in the invention is also limited by the mean width RSm of roughness profile elements, as defined according to JIS-B-0601 (2001) as a parameter in the spacing direction. Specifically, a feature of the surface of the front-side synthetic resin composition layer 12 is that the mean width RSm of roughness profile elements is 500 to 2,000 μm at cut-off values λs and λc of 0.25 mm and 8 mm, respectively, as measured according to JIS-B-0601 (2001). The mean width RSm of roughness profile elements is preferably 740 to 1,200 μm. If RSm is less than 500 μm, the number of projections 12a and depressions 12b will be too large, thus increasing the total wear area, and making it impossible to attain the effects of the invention. An RSm exceeding 2,000 μm will result in an excessively small number of projections 12a and depressions 12b, and thus, will not contribute to the effects of the invention even if the arithmetic mean deviation Ra is within the above-defined range. Further, short-wavelength components at cut-off values λs of less than 0.25 mm do not contribute to the effects of the invention. Long-wavelength components at cut-off values λc exceeding 8 mm do not also contribute to the effects of the invention.

The adhesive layer 15 is formed on the rear-side synthetic resin composition layer 14, and the release paper 16 is further laminated to a surface of the adhesive layer 15. Material of the adhesive layer 15 used in the invention is not particularly limited as long as it has sufficient adhesive or bonding properties for applications to floor surfaces. A material containing an acrylic resin or synthetic rubber resin as a principal component can be used. The adhesive layer 15 is formed by applying this material to the rear-side synthetic resin composition layer 14. The thickness of the adhesive layer 15 must be 30 to 160 μm, and is more preferably 70 to 100 μm. If the thickness of the adhesive layer 15 is less than 30 μm, desired adhesion cannot be obtained, or the maintenance of adhesion will be difficult. A thickness of the adhesive layer 15 exceeding 160 μm is disadvantageous in terms of costs.

The release paper 16 is made of crepe paper that has been creped and having a tensile elongation at break of 5 to 50% as measured according to JIS-P-8113. Specifically, the release paper 16 is produced by, for example, creping Kraft paper or the like used as the substrate 11, and by laminating a general thermoplastic resin to the thus-obtained crepe paper, and by applying a release agent thereto. A thermoplastic resin is laminated to one surface of the crepe paper by extrusion lamination of a hot-melt resin of a known polyethylene or the like. Known thermoplastic resins such as polyolefin resins are usable as the thermoplastic resin. Examples of preferable resins include L-LDPE (linear low-density polyethylenes), MDPE (middle-density polyethylenes), HDPE (high-density polyethylenes), and PP (polypropylenes). A silicone resin is typically used as the release agent. The release paper 16 made of crepe paper is obtained by applying a silicone to the thermoplastic resin-laminated surface of the crepe paper.

The display sheet 10 including the substrate 11; the front-side and rear-side synthetic resin composition layer 12 and 14 formed on the front and rear surfaces, respectively, of the substrate 11; the adhesive layer 15 formed on the rear-side synthetic resin composition layer 14; and the release paper 16 laminated to the surface of the adhesive layer 15 preferably has a total thickness of 1.0 mm or less. If the total thickness including the release paper 16 exceeds 1.0 mm, it may go beyond the thickness suitable for ink-jet printers when the ink layer 13 is formed by, for example, ink-jet printing. The ink layer 13 formed on the surface of the front-side synthetic resin composition layer 12 by an ink-jet printer is formed by causing a fine ink to cover the projections 12a and permeate the depressions 12b.

The display sheet 10 with this structure is wound for storage prior to the formation of the ink layer 13. After unwinding the display sheet 10 from its stored state, the ink layer 13 is formed on the surface of the front-side synthetic resin composition layer 12. The display sheet has a relatively large thickness because the substrate 11 is made of sailcloth, and the adhesive layer 15 is additionally formed. A display sheet is typically wound with the release paper 16 facing outside. When such a relatively thick display sheet is wound with the release paper 16 facing outside, the release paper 16 is maintained under a great tension in the direction of elongation. However, in the display sheet 10 of the invention, because crepe paper having a tensile elongation at break of 5 to 50% is used as the release paper 16, the release paper 16 placed under a tension in the direction of elongation elongates together with the adhesive layer 15. This prevents the release paper 16 and adhesive layer 15 from shifting relative to each other.

After unwinding the display sheet that has been wound for storage, the ink layer 13 is formed on the surface of the front-side synthetic resin composition layer 12, thereby yielding the display sheet 10 of the invention. Examples of printing methods for forming the ink layer 13 include, although not particularly limited to, ink-jet printing, silkscreen printing, offset printing, gravure printing, letterpress printing, and planographic printing. After unwinding the wound display sheet at the time of printing, if the release paper 16 has any shift between layers or any remaining elongated portion, it tends to have a tunnel caused by partial peeling from the adhesive layer. The formation of such a tunnel causes troubles during printing by ink-jet printing. However, because crepe paper having a tensile elongation at break of 5 to 50% is used as the release paper 16 in the display sheet 10 of the invention, unwinding of the wound sheet causes the release paper 16 to shrink together with the adhesive layer 15 in the longitudinal direction, thereby preventing the formation of a tunnel in the release paper 16.

The display sheet 10 of the invention having the ink layer 13 is subsequently cut or the like to a predetermined size, and used by being attached to a floor surface exposed to the traffic of pedestrians. The display sheet 10 is attached to a floor surface by using the adhesive layer 15 that appears on the surface by removing the release paper 16. The adhesive layer 15 facilitates the attachment of the display sheet to the floor surface.

Furthermore, in the display sheet 10 of the invention, a protective layer that has conventionally been formed on a printed surface is omitted, and the ink layer 13 is present as the outermost layer. Therefore, the ink layer 13 cannot be protected from the traffic of pedestrians, and thus, becomes worn by the traffic of pedestrians. However, in the display sheet 10 of the invention, sailcloth having projections and depressions on surfaces thereof is used as the substrate 11; the surface of the front-side synthetic resin composition layer 12 has projections 12a and depressions 12b attributed to the projections and depressions of the surface of the substrate 11; and the ink layer 13 is formed by causing a fine ink to permeate the depressions 12b of the front-side synthetic resin composition layer 12. Therefore, when the ink layer 13 becomes worn by the traffic of pedestrians, the projections 12a of the front-side synthetic resin composition layer 12 appear on the surface, as shown in FIG. 2. Moreover, because of the use of a material having a relatively high mechanical strength, the projections 12a of the front-side synthetic resin composition layer 12 are resistant to wear as compared to the ink layer 13. For this reason, the ink layer 13 remaining in the depressions 12b of the front-side synthetic resin composition layer 12 is protected by the projections 12a adjacent to the depressions 12b. Hence, even when the display sheet is used on an outdoor floor surface on which people frequently walk, deterioration of the visibility of a display or decoration due to the wear of the printed surface can be prevented.

Furthermore, the display sheet 10 of the invention may further include an anti-stain coating layer on the surface of the ink layer 13 for preventing deterioration of the visibility due to stains on the ink layer 13. The anti-stain coating layer may be formed as the outermost layer. Examples of materials of the anti-stain coating layer include fluororesin anti-stain agents such as fluororesin solvents and fluororesin/acrylic resin solvents; emulsion/latex anti-stain agents such as ethylene-vinyl acetate copolymer resin emulsions, acrylic resin emulsions, and synthetic rubber latex; sodium silicate (i.e., water glass) anti-stain agents such as sodium silicate and sodium silicate/acrylic resin mixed solutions; and inorganic nanoparticle anti-stain agents such as titanium dioxide and silicon dioxide. Examples of coating methods include comma coating, doctor knife coating, reverse roll coating, gravure coating, and bar coating. Gravure coating and screen coating are particularly preferable since they are methods suitable for application of coating solutions. The thickness of the anti-stain coating layer is preferably 0.5 to 200 µm.

Accordingly, when the display sheet 10 of the invention is used by being attached to a floor surface exposed to the traffic of pedestrians, it has an excellent ability to maintain the visibility of a display or decoration on its printed surface, as compared to conventional display sheets not having a protective layer on their printed surfaces. The display sheet 10 also does not undergo a significant loss of the visibility of a display or decoration on its printed surface, as compared to conventional display sheets having a protective layer on their printed surfaces. Therefore, the display sheet 10 of the invention does not require a protective layer that has conventionally been required for applications to floor surfaces. The display sheet 10, hence, is useful in reducing costs and simplifying the manufacturing process.

Moreover, because sailcloth is used as the substrate 11, the display sheet 10 of the invention has a very high strength, i.e., a tensile strength at break of 1,000 N/3 cm or more. Therefore, the display sheet 10 of the invention has excellent durability, as compared to conventional display sheets using a material other than sailcloth as the substrate 11. Furthermore, a used display sheet can be easily and neatly peeled from a floor or wall surface without breaking the display sheet, thus leading to excellent workability.

EXAMPLES

Examples of the invention are next described together with comparative examples.

Example 1

A sheet (tradename "Cremona", manufactured by Kuraray, Co., Ltd.) was prepared that included a substrate 11 made of a polyester resin fiber woven fabric, i.e., sailcloth; and front-side and rear-side synthetic resin composition layers 12, 14 made of vinyl chloride and formed on front and rear surfaces, respectively, of the substrate 11. The surface quality of this sheet was measured according to JIS-B-0601 (2001). As a result, the sheet had an Ra of 18.6 µm and an RSm of 1,165.2 µm.

On this sheet ("Cremona") was formed an 80 µm thick adhesive layer by a transfer method, using elastic release paper 16 made of 200 µm thick crepe paper. This resulted in a sheet having a total thickness of 820 µm including the substrate 11; the front-side and rear-side synthetic resin composition 12, 14 formed on the front and rear surfaces, respectively, of the substrate 11; an adhesive layer 15 formed on the rear-side synthetic resin composition layer 14; and the release paper 16 laminated to a surface of the adhesive layer 15. Note that the polyester resin fiber woven fabric, which is the sailcloth used, had an average thickness of 367 µm and a mass of 238 g/m$^2$. The polyester resin fiber woven fabric was made of warp yarns having 59 decitex and a yarn density of 46 yarns per inch (18.1 yarns per cm) and weft yarns having 59 decitex and a yarn density of 42 yarns per inch (16.5 yarns per cm).

A display sheet of the invention was obtained by printing on this sheet given 10 letters each measuring 30×30 mm, using an ink-jet printer (model type "Roland PRO III", manufactured by Roland DG Corporation). The display sheet of Example 1 was thus produced.

Example 2

A sheet with a width of 100 mm was prepared that included a substrate 11 made of a polyester resin fiber woven fabric, i.e., sailcloth; and front-side and rear-side synthetic resin composition layers 12, 14 formed on the substrate 11. The surface quality of this sheet was measured according to JIS-B-0601 (2001). As a result, the sheet had an Ra of 37.2 µm and an RSm of 1,127 µm.

On this sheet was formed an 80 µm thick adhesive layer by a transfer method, using elastic release paper 16 made of 200 µm thick crepe paper. This resulted in a sheet having a total thickness of 800 μm including the substrate 11; the front-side and rear-side synthetic resin composition 12, 14 formed on the front and rear surfaces, respectively, of the substrate 11; an adhesive layer 15 formed on the rear-side synthetic resin composition layer 14; and the release paper 16 laminated to a surface of the adhesive layer 15. Note that the polyester resin fiber woven fabric, which is the sailcloth used, had an average thickness of 420 μm and a mass of 270 g/m². The polyester resin fiber woven fabric was made of warp yarns having 66 decitex and a yarn density of 46 yarns per inch (18.1 yarns per cm) and weft yarns having 66 decitex and a yarn density of 42 yarns per inch (16.5 yarns per cm).

A display sheet of the invention was obtained by printing on this sheet given 10 letters each measuring 30×30 mm, using an ink-jet printer (model type "Roland PRO III", manufactured by Roland DG Corporation). The display sheet of Example 2 was thus produced.

Example 3

A sheet (tradename "Kaldi", manufactured by Kuraray, Co., Ltd.) was prepared that included a substrate 11 made of a polyester resin fiber woven fabric, i.e., sailcloth; and front-side and rear-side synthetic resin composition layers 12, 14 made of vinyl chloride and formed on front and rear surfaces, respectively, of the substrate 11. The surface quality of this sheet was measured according to JIS-B-0601 (2001). As a result, the sheet had an Ra of 14.3 μm and an RSm of 744.8 μm.

On this sheet ("Kaldi") was formed an 80 μm thick adhesive layer by a transfer method, using elastic release paper 16 made of 200 μm thick crepe paper. This resulted in a sheet having a total thickness of 630 μm including the substrate 11; the front-side and rear-side synthetic resin composition 12, 14 formed on the front and rear surfaces, respectively, of the substrate 11; an adhesive layer 15 formed on the rear-side synthetic resin composition layer 14; and the release paper 16 laminated to a surface of the adhesive layer 15. Note that the polyester resin fiber woven fabric, which is the sailcloth used, had an average thickness of 290 μm and a mass of 160 g/m². The polyester resin fiber woven fabric was made of warp yarns having 29.5 decitex and a yarn density of 66 yarns per inch (26 yarns per cm) and weft yarns having 29.5 decitex and a yarn density of 60 yarns per inch (23.6 yarns per cm).

A display sheet of the invention was obtained by printing on this sheet given 10 letters each measuring 30×30 mm, using an ink-jet printer (model type "Roland PRO III", manufactured by Roland DG Corporation). The display sheet of Example 3 was thus produced.

Example 4

A display sheet of the invention was obtained as in Example 1, except that printing was performed by a silk-screen printing method instead of the ink-jet printing method. Silk-screen printing was performed using a 150 mesh polyester screen as the printing plate. A diluted solution of a 100:20 mixture of a black ink (EXG3590, manufactured by Jujo Chemical Co., Ltd.) and a vinyl standard solvent (manufactured by Jujo Chemical Co., Ltd.) was prepared as a printing ink. Using the printing plate and printing ink, 10 letters each measuring 30×30 mm were printed by hand-printing. The display sheet of Example 4 was thus produced.

Comparative Example 1

A sheet with a width of 100 mm and a thickness of 1,120 μm was prepared that included a substrate 11 made of a polyester resin fiber woven fabric, which was a twill woven fabric and not sailcloth; and front-side and rear-side synthetic resin composition layers 12 and 14 formed on the substrate 11. The surface quality of this sheet was measured according to JIS-B-0601 (2001). As a result, the sheet had an Ra of 120.6 μm and an RSm of 2,025 μm.

On this sheet was formed an 80 μm thick adhesive layer by a transfer method, using elastic release paper 16 made of 200 μm thick crepe paper. This resulted in a sheet having a total thickness of 1,400 μm including the substrate 11; the front-side and rear-side synthetic resin composition 12, 14 formed on front and rear surfaces, respectively, of the substrate 11; an adhesive layer 15 formed on the rear-side synthetic resin composition layer 14; and the release paper 16 laminated to a surface of the adhesive layer 15. Note that the polyester resin fiber twill woven fabric used had an average thickness of 630 μm and a mass of 350 g/m². The polyester resin fiber woven fabric was made of warp yarns having 83 decitex and a yarn density of 20 yarns per inch (7.9 yarns per cm) and weft yarns having 83 decitex and a yarn density of 16 per inch (6.3 yarns per cm).

A display sheet was obtained as in Example 1 by printing on this sheet given 10 letters each measuring 30×30 mm, using an ink-jet printer (model type "Roland PRO III", manufactured by Roland DG Corporation). The display sheet of Comparative Example 1 was thus produced.

Comparative Example 2

A commercially available, general wall paper was prepared. The surface quality of this wall paper was measured according to JIS-B-0601 (2001). As a result, the sheet had an Ra of 61.1 μm and an RSm of 2,857 μm.

On this wall paper was formed an 80 μm thick adhesive layer by a transfer method, using elastic release paper 16 made of 200 μm thick crepe paper. This resulted in a sheet having a total thickness of 630 μm including a substrate 11; front-side and rear-side synthetic resin composition 12, 14 formed on front and rear surfaces, respectively, of the substrate 11; an adhesive layer 15 formed on the rear-side synthetic resin composition layer 14; and the release paper 16 laminated to a surface of the adhesive layer 15.

A display sheet of the invention was obtained by printing on this sheet given 10 letters each measuring 30×30 mm, using an ink-jet printer (model type "Roland PRO III", manufactured by Roland DG Corporation). The display sheet of Comparative Example 2 was thus produced.

<Evaluation Test and Evaluation 1>

Figure 3:
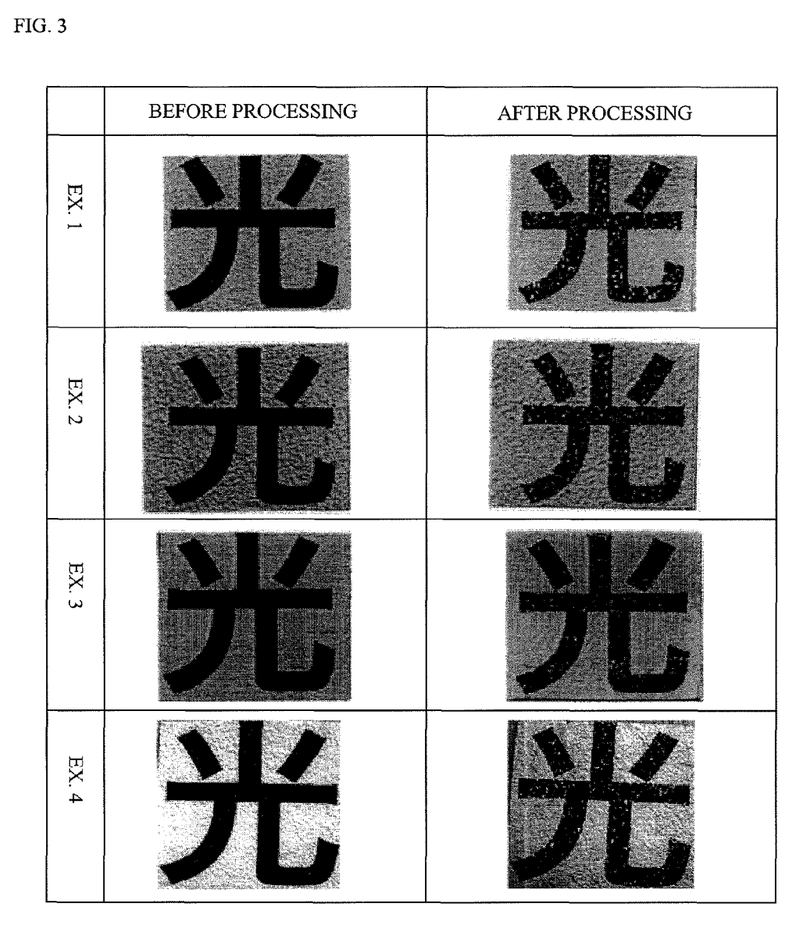
FIG. 3 shows photographs of the display sheets of the Examples before and after processing.
Figure 4:
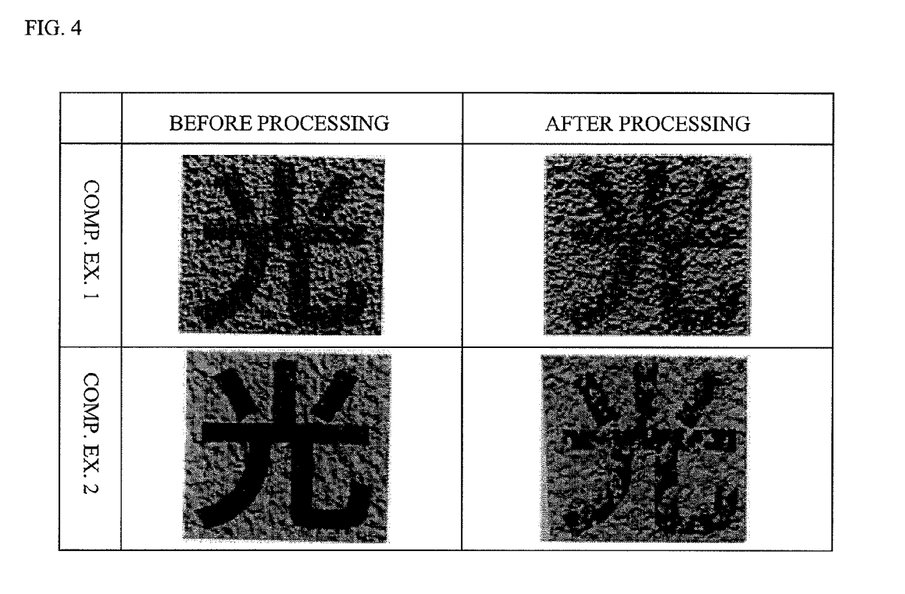
FIG. 4 shows photographs of the display sheets of the Comparative Examples before and after processing.

The surface of each of the display sheets of Examples 1 to 4 and Comparative Examples 1 and 2 was abraded by moving #400 sandpaper across the surface in parallel and back 200 times. The visibility was subsequently visually evaluated. The visibility of the display or decoration was evaluated as follows: "good" means that the given one letter measuring 30×30 mm was roughly legible; and "defective" means that the abrasion was so severe that the letter was difficult to read, or, although the letter was legible, it had lost most of its shape. Table 1 shows the results along with the surface shape values. FIGS. 3 and 4 each show photographs of the display sheets before and after processing of the abrasion of the surfaces with the sandpaper.

TABLE 1

|  | Ex. 1 | Ex. 2 | Ex. 3 | Ex. 4 | Comp. Ex. 1 | Comp. Ex. 2 |
|---|---|---|---|---|---|---|
| Ra[μm] | 18.6 | 37.2 | 14.3 | 18.6 | 120.6 | 61.1 |
| RSm[μm] | 1165.2 | 1127 | 744.8 | 1165.2 | 2025 | 2857 |
| Evaluation | Good | Good | Good | Good | Defective | Defective |

As is clear from Table 1 and FIGS. 3 and 4, the display sheets of Examples 1 to 4 were evaluated as being "good" according to the test method. In contrast, the display sheets of Comparative Examples 1 and 2 were evaluated as being "defective" according to the test method. These results indicate that the ink layer formed on the synthetic resin composition layer can be protected by forming the surface of the synthetic resin composition layer to be an irregular surface having appropriate projections and depressions. Further, the results indicate that the irregular surface of the synthetic resin composition layer having appropriate projections and depressions has an arithmetic mean deviation Ra of roughness profile of 10 to 50 μm, and a mean width RSm of roughness profile elements of 500 to 2,000 μm, at a cut-off value λc of 8 mm, as measured according to JIS-B-0601 standard (2001).

<Evaluation Test and Evaluation 2>

Each of the display sheets obtained in Example 1 and Comparative Example 1 was evaluated in terms of the tensile strength at break and durability. The results are shown in Table 2 below.

(1) Tensile Strength at Break: The tensile strength at break of each of the display sheets obtained in Example 1 and Comparative Example 1 was measured according to "JISL-1096 method A, Strip method".

(2) Durability: Each of the display sheets obtained in Example 1 and Comparative Example 1 was attached to the surface of an asphalt-paved road, and the surface was exposed to an actual traffic of pedestrians for two months. The display sheet was then manually peeled from the road surface. In Table 2, the sign "A" indicates that the display sheet was completely peeled without any breakage; and the sign "B" indicates that the display sheet broke during peeling, leaving an unpeeled portion on the road surface, causing difficulty in the peeling operation.

TABLE 2

|  | Ex. 1 | Comp. Ex. 1 |
|---|---|---|
| Tensile Strength at Break [N/3 cm] | 1421 | 246 |
| Durability Test | A | B |

As is clear from Table 2, a comparison of the results of Example 1 and Comparative Example 1 has demonstrated that the display sheet of Example 1 of the invention exhibited a high tensile strength at break, i.e., 1,000 N/3 cm or more. The display sheet of Example 1 was also highly evaluated in terms of its durability after long-term use. The display sheet did not break during peeling, and was completely peeled without leaving any unpeeled portion on the road surface. This demonstrated that the display sheet of the invention also exhibited excellent workability.

Example 5

A solvent-type fluororesin solution containing 6 mass % of a fluororesin, 10 mass % of an acrylic resin, and 84 mass % of a solvent was prepared. The solution was applied in an amount of 20 g/m² to the ink layer of the display sheet obtained in Example 1, using a bar coater. The applied solution was subsequently dried at a temperature of 100° C. for 3 minutes, thereby forming an anti-stain coating layer.

Example 6

An anti-stain coating layer was formed as in Example 4, except that a 9 mass % aqueous titanium oxide solution was used instead of the solvent-type fluororesin solution, and the aqueous titanium oxide solution was applied in an amount of 15 g/m².

Example 7

An anti-stain coating layer was formed as in Example 4, except that a 50 mass % EVA emulsion (manufactured by Chuo-Rika, Co., Ltd.) was used instead of the solvent-type fluororesin solution, and the emulsion was applied in an amount of 30 g/m².

<Evaluation Test and Evaluation 3>

Each of the display sheets of Examples 5 to 7 having the anti-stain coating layer was evaluated in terms of the anti-stain properties and the ease of cleaning. The results are shown in Table 3 below.

(1) Anti-stain properties: The display sheet was attached to an indoor concrete floor, and exposed to an actual traffic of pedestrians for one week. The degree of contamination (%) of the surface of the used display sheet was measured. The degree of contamination (%) was determined as follows: the degree of whiteness (the L value of the Lab notation according to the CIELab color system) was measured for the surface of each of the unused display sheet and the used display sheet, using a color difference meter (manufactured by Minolta Co., Ltd.), and the degree of contamination (%) was calculated according to the following Equation (1):

$$\text{Degree of contamination} = \{(\text{the } L \text{ value of the unused display sheet} - \text{the } L \text{ value of the used display sheet})/\text{the } L \text{ value of the unused display sheet}\} \times 100 \quad (1)$$

(2) Ease of Cleaning: The surface of the used display sheet was wiped with a damp cloth and then with a dry cloth, and the ease of removing stains was visually evaluated. In Table 3, the sign "A" indicates that stains were readily removed; the sign "B" indicates that stains were removed to some extent, but not completely; and the sign "C" indicates that stains were not removed at all.

TABLE 3

|  | Ex. 5 | Ex. 6 | Ex. 7 | Without Anti-Stain Coating Layer |
|---|---|---|---|---|
| Degree of Contamination (%) | 6 | 8 | 10 | 15 |
| Ease of Cleaning | A | A to B | A to B | B |

As is clear from Table 3, it was demonstrated that each of the display sheets of Examples 5 to 7 having the anti-stain coating layer had a low degree of contamination as compared to the display sheet not having an anti-stain coating layer, and exhibited improved anti-stain properties. It was also demonstrated that each of the display sheets of Examples 5 to 7 having the anti-stain coating layer was also highly evaluated in terms of the ease of cleaning, as compared to the display sheet not having an anti-stain coating layer.

INDUSTRIAL APPLICABILITY

The display sheet can be used as a display sheet that is attached to a floor surface paved with asphalt, concrete, or mortar, as a simple advertisement or guide sign in indoor or outdoor places exposed to the traffic of pedestrians.

The invention claimed is:

1. A display sheet comprising:
   a substrate whose rear surface is to be bonded to a floor surface or wall surface;
   a front-side synthetic resin composition layer formed on a front surface of the substrate;
   a rear-side synthetic resin composition layer formed on a rear surface of the substrate; and
   an ink layer formed on the front-side synthetic resin composition layer; wherein
   the substrate is made of sailcloth having projections and depressions on front and rear surfaces thereof, and having an average thickness of 200 to 500 μm and a mass of 100 to 300 g/m$^2$;
   a surface of the front-side synthetic resin composition layer is formed on an irregular surface having projections and depressions attributed to the projections and depressions of the surface of the substrate;
   the surface of the front-side synthetic resin composition layer has an arithmetic mean deviation (Ra) of roughness profile of 10 to 50 μm, and a mean width (RSm) of roughness profile elements of 500 to 2,000 μm, at cut-off values λs and λc of 0.25 mm and 8 mm, respectively, as measured according to JIS-B-0601 standard (2001);
   a surface of the rear-side synthetic resin composition layer is formed on an irregular surface having projections and depressions attributed to the projections and depressions of the surface of the substrate;
   an adhesive layer to be bonded to the floor surface or wall surface is formed on the rear-side synthetic resin composition layer; and
   the ink layer is formed by causing a fine ink to cover the projections and permeate the depressions.

2. The display sheet according to claim 1, wherein the sailcloth is a woven fabric made of warp yarns of a synthetic fiber having a decitex of 22 to 67 and a yarn density of 40 to 80 yarns per inch (15.7 to 31.5 yarns per cm); and weft yarns of a synthetic fiber having a decitex of 22 to 67 and a yarn density of 30 to 70 yarns per inch (11.8 to 27.6 yarns per cm).

3. The display sheet according to claim 2, wherein the ink layer covering the projections and formed in the depressions is present as an outermost layer.

4. The display sheet according to claim 3, further comprising an adhesive layer formed on the rear-side synthetic resin composition layer, and a release paper laminated to a surface of the adhesive layer, wherein the release paper is made of crepe paper that has been creped and having a tensile elongation at break of 5 to 50% as measured according to JIS-P-8113.

5. The display sheet according to claim 2, further comprising an anti-stain coating layer on a surface of the ink layer covering the projections and formed in the depressions.

6. The display sheet according to claim 5, wherein the anti-stain coating layer is present as an outermost layer.

7. The display sheet according to claim 6, further comprising an adhesive layer formed on the rear-side synthetic resin composition layer, and a release paper laminated to a surface of the adhesive layer, wherein the release paper is made of crepe paper that has been creped and having a tensile elongation at break of 5 to 50% as measured according to JIS-P-8113.

8. The display sheet according to claim 5, further comprising an adhesive layer formed on the rear-side synthetic resin composition layer, and a release paper laminated to a surface of the adhesive layer, wherein the release paper is made of crepe paper that has been creped and having a tensile elongation at break of 5 to 50% as measured according to JIS-P-8113.

9. The display sheet according to claim 2, further comprising an adhesive layer formed on the rear-side synthetic resin composition layer, and a release paper laminated to a surface of the adhesive layer, wherein the release paper is made of crepe paper that has been creped and having a tensile elongation at break of 5 to 50% as measured according to JIS-P-8113.

10. The display sheet according to claim 1, wherein the ink layer covering the projections and formed in the depressions is present as an outermost layer.

11. The display sheet according to claim 10, further comprising an adhesive layer formed on the rear-side synthetic resin composition layer, and a release paper laminated to a surface of the adhesive layer, wherein the release paper is made of crepe paper that has been creped and having a tensile elongation at break of 5 to 50% as measured according to JIS-P-8113.

12. The display sheet according to claim 1, further comprising an anti-stain coating layer on a surface of the ink layer covering the projections and formed in the depressions.

13. The display sheet according to claim 12, wherein the anti-stain coating layer is present as an outermost layer.

14. The display sheet according to claim 13, further comprising an adhesive layer formed on the rear-side synthetic resin composition layer, and a release paper laminated to a surface of the adhesive layer, wherein the release paper is made of crepe paper that has been creped and having a tensile elongation at break of 5 to 50% as measured according to JIS-P-8113.

15. The display sheet according to claim 12, further comprising an adhesive layer formed on the rear-side synthetic resin composition layer, and a release paper laminated to a surface of the adhesive layer, wherein the release paper is made of crepe paper that has been creped and having a tensile elongation at break of 5 to 50% as measured according to JIS-P-8113.

16. The display sheet according to claim 1, wherein the ink layer is formed by causing a fine ink to cover the projections and permeate the depressions, using an ink-jet method or a silk-screen printing method.

17. The display sheet according to claim 16, further comprising an adhesive layer formed on the rear-side synthetic resin composition layer, and a release paper laminated to a surface of the adhesive layer, wherein the release paper is made of crepe paper that has been creped and having a tensile elongation at break of 5 to 50% as measured according to JIS-P-8113.

18. The display sheet according to claim 1, further comprising an adhesive layer formed on the rear-side synthetic resin composition layer, and a release paper laminated to a surface of the adhesive layer, wherein the release paper is made of crepe paper that has been creped and having a tensile elongation at break of 5 to 50% as measured according to JIS-P-8113.

* * * * *